United States Patent [19]

Jenkinson

[11] Patent Number: 4,690,802

[45] Date of Patent: Sep. 1, 1987

[54] APPARATUS FOR CONTROLLING THE TEMPERATURE IN CATALYST REGENERATION

[75] Inventor: Ronald J. Jenkinson, Madison, N.J.

[73] Assignee: Exxon Research and Engineering Company, Florham Park, N.J.

[21] Appl. No.: 815,211

[22] Filed: Dec. 31, 1985

[51] Int. Cl.[4] ............................................. B01J 8/26
[52] U.S. Cl. ................................. 422/141; 422/144; 422/146; 422/200; 422/223; 502/44; 165/104.16; 165/104.18
[58] Field of Search ............... 422/141, 144, 146, 200, 422/223; 502/44; 122/4 D; 165/104.16, 104.18; 34/10, 57 A

[56] References Cited

U.S. PATENT DOCUMENTS 2,414,852 1/1947 Bornside et al. .................... 422/144
2,906,609 9/1959 Harder ................................ 422/144
4,009,121 2/1977 Luckenbach ........................ 252/417
4,338,283 7/1982 Saramoto et al. ................... 422/124

FOREIGN PATENT DOCUMENTS 763843 12/1956 United Kingdom ................ 422/146

Primary Examiner—David L. Lacey
Attorney, Agent, or Firm—Marthe L. Gibbons; Henry E. Naylor

[57] ABSTRACT

An apparatus and method are provided to remove the heat during the regeneration of catalyst particles. A regenerator comprises a regeneration zone and a cooling zone having disposed therein a steam coil. The two zones are separated by a vertical partition open at both ends. Colder catalysts from the cooling zone flows into the regeneration zone and visa versa due to differences in densities of the fluidized particles in each zone. The flow of aeration steam to the cooling zone is controlled by a valve.

3 Claims, 2 Drawing Figures

APPARATUS FOR CONTROLLING THE TEMPERATURE IN CATALYST REGENERATION

BACKGROUND OF THE INVENTION

1. Field of the Invention

This invention relates to an apparatus and method for controlling the temperature during the regeneration of fluid catalytic conversion processes. More particularly, it relates to an improved regenerator and a method of removing heat from a bed of solid catalyst particles undergoing regeneration by combustion of carbonaceous deposits on the catalyst with an oxygen-containing gas in the regenerator of a fluid catalytic cracking unit.

2. Description of Information Disclosures

On most fluid catalytic cracking units, it is necessary to remove heat at a controllable rate from the regenerator when spent catalyst is regenerated by burning off carbonaceous material with an oxygen-containing gas, such as air, to maintain equilibrium cracking conditions since the exothermic heat of regeneration imparted to the catalyst is transmitted to the fresh oil feed to the cracking reactor. It is also necessary to remove heat continuously to prevent undue regeneration temperature levels tending to sinter or deactivate the catalyst by surface area reduction. When heavy hydrocarbonaceous feeds, such as atmospheric residua, vacuum residua and heavy crude oils are catalytically cracked, a greater amount of carbon deposits on the catalyst particles than in cracking of feeds, such as gas oil. When the spent catalyst from the catalytic cracking of such heavy hydrocarbon feeds is regenerated by combustion with an oxygen-containing gas in a regeneration vessel, the heat removal problem is further aggravated since more heat is released in the regenerator than that which can be utilized in the process.

Various methods have been proposed to remove heat from a regenerator. The heat removal has been accomplished by withdrawing a portion of the catalyst from the catalyst bed in the regenerator and circulating it through a tubular waste heat boiler so as to cool it before returning it to the catalyst bed. It is also known to use steam coils in the regenerator as a means of heat recovery and temperature control. See, for example, U.S. Pat. No. 4,009,121. When a steam coil is placed in the bed of a regenerator, the heat removed by the coil cannot readily be varied or controlled. It has now been found that the heat removal in a catalyst regenerator can be controlled by utilizing an improved regenerator.

SUMMARY OF THE INVENTION

In accordance with the invention, there is provided in a regenerator adapted to contain a bed of fluidized catalyst which comprises catalyst inlet means, catalyst outlet means, gas inlet means, gas outlet means, catalyst support means and a tubular coil adapted to contain $H_2O$, the improvement which comprises: a partition disposed in said regenerator at a spaced distance above said catalyst support means, said tubular coil being disposed in a space between said partition and the inner wall of said regenerator, a baffle connected to said catalyst support means and projecting vertically upwardly, said baffle being at a spaced distance from said partition, said catalyst support means being imperforated from below said baffle to below a first zone formed by said partition and said inner wall of said regenerator wherein said coil is disposed, and said catalyst support means having orifices below a second zone formed by said partition and an inner wall of said regenerator, means for introducing a first fluidizing gas into said first zone, means for introducing a second fluidizing gas into said second zone, means for introducing a third fluidizing gas into the space between said baffle and said partition, and control means disposed in said means for introducing said third fluidizing gas between said baffle and said partition.

Furthermore, in accordance with the invention, there is also provided a method for removing heat during the regeneration of solid catalyst particles.

DESCRIPTION OF THE PREFERRED EMBODIMENT

The preferred embodiment will be described with reference to the accompanying drawings and is applied to regeneration of spent cracking catalysts for simplicity of description but it should be understood that the apparatus and process are equally applicable to treatment of other fluidized solids in which heat is generated in the fluid bed and in which it is desired to control the heat produced in the fluid bed.

Figure 1:
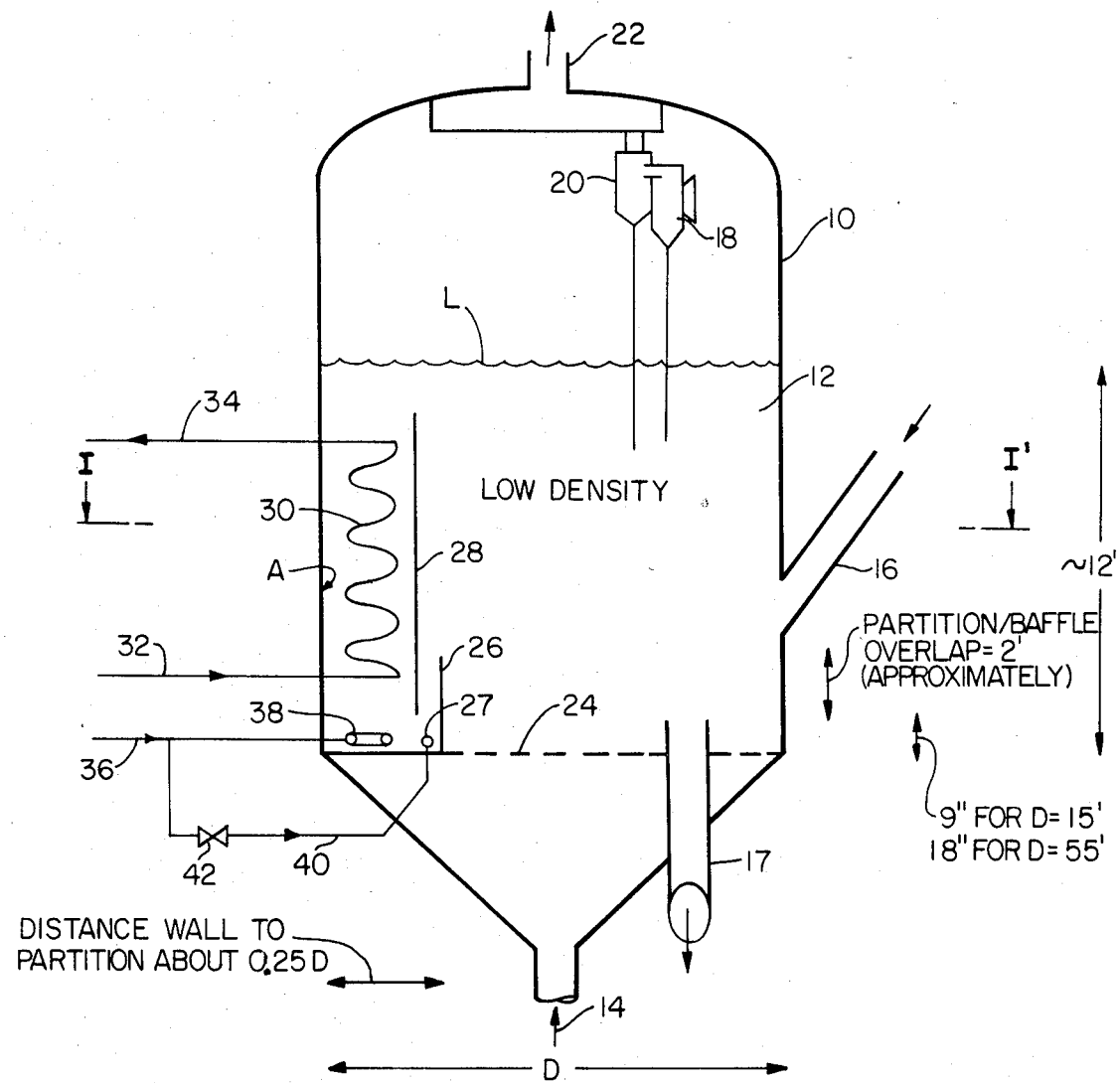
FIG. 1 is a schematic plan of an apparatus in sectional elevation view illustrating one embodiment of the invention.
Figure 2:
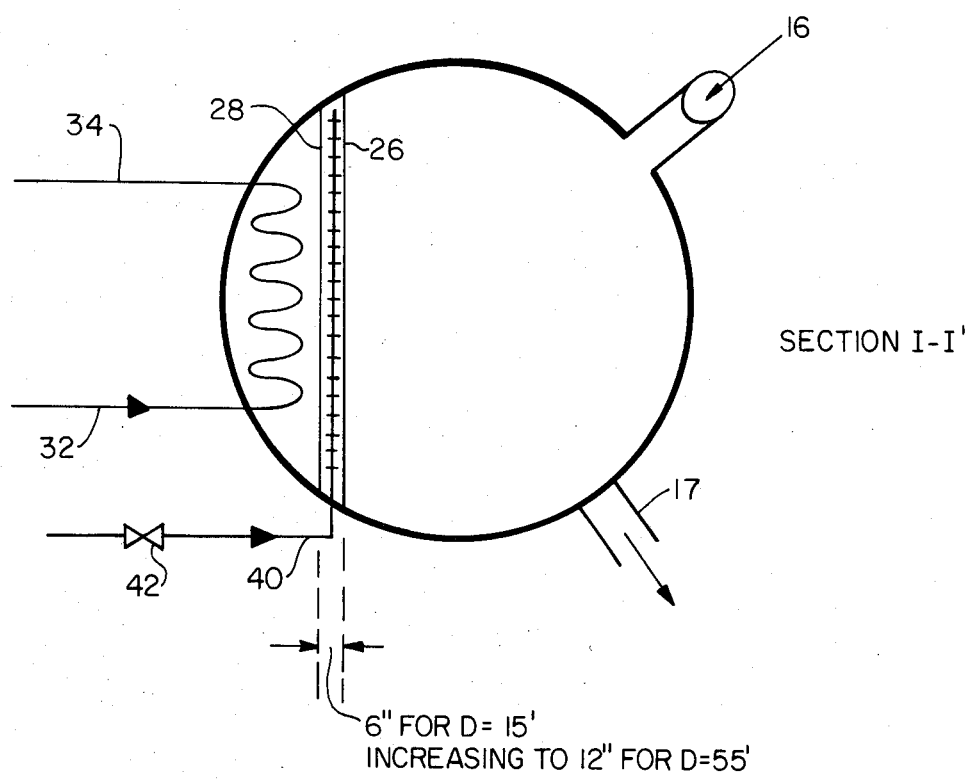
FIG. 2 is a cross-sectional view of the apparatus of FIG. 1 taken along plane I-I'.

Referring to FIG. 1, a regenerator 10 contains a bed 12 having a level L of fluidized catalyst particles having carbonaceous deposits thereon which are undergoing regeneration by combustion of the carbonaceous deposits with an oxygen-containing gas such as air introduced by line 14. A sufficient amount of oxygen-containing gas is introduced into the regenerator to maintain the catalyst particles fluidized and at the desired density. Spent catalyst is introduced to bed 12 by line 16 and regenerated catalyst is removed from the regenerator by line 17. Combustion gas evolved from the regeneration and entrained catalyst particles pass through cyclones 18 and 20 where the entrained particles are removed and returned to the regeneration bed via cyclone diplegs, while the combustion gases are removed from the regenerator by line 22. Fluidized regeneration bed 12 for regeneration of cracking catalyst is generally maintained at a temperature ranging from about 1200° to about 1400° F. Catalyst supporting means, such as plate 24, is disposed in the bottom portion of regenerator 10 to support the bed of catalyst. Plate 24 has orifices or perforations in at least a portion of it to permit the oxygen-containing gas to pass into the regeneration bed (12) to contact the spent catalyst particles. A baffle 26 is attached to plate 24 and projects vertically upwardly. At a spaced distance from the baffle, for example, at a distance ranging from about 6 to 12 inches when the regenerator has a diameter ranging from 15 to 55 feet, is disposed a partition 28 such as a plate having its lower end at a spaced distance from plate 24, for example, at a distance ranging from 9 to 18 inches, and an upper end that terminates below the expected upper level L of the fluidized bed when the process is in operation. For example, baffle 26 may have a height sufficient to overlap partition 28 by about 2 feet. The portion of supporting means, i.e., plate 24, that extends horizontally from baffle 26 to the inner wall A of regenerator 10 does not have orifices. This portion of the catalyst supporting means could be a separate plate that extends along the same horizontal axis as perforated plate 24. A tubular coil 30 is disposed in the space between partition 28 and inner wall A in a fluidized bed of catalyst. The space formed by the partition and inner wall A will hereinafter be designated as the cooling zone. Water is introduced into coil 30 by line 32 and water and steam are removed from the coil by line 34. Aeration steam is introduced by line 36 to a mattress 38 disposed in the bottom of the space formed by partition 28 and inner wall A to maintain the catalyst particles fluidized in the cooling zone. The aeration steam is introduced in an amount such that the bed of catalyst particles in the zone between partition 28 and wall A have a higher density than the density of the fluidized bed of particles in regeneration bed 12. Suitable densities of the catalyst bed in the cooling zone and the catalyst bed in the regeneration zone are shown in Table I. A portion of the aeration steam of line 36 is passed by line 40 to a steam sparge 27 in regenerator 10 that extends the length of the baffle a valve 42 disposed in line 40. When valve 42 is closed, the catalyst between the baffle and the partition is not fluidized and forms a seal. However, aeration steam flows through the holes in the mattress and keeps the catalyst around coil 30. Although the partition does not extend to the top of the bed, catalyst does not flow from the regeneration bed over the tubular coil because the outlet is closed by defluidized catalyst. When valve 42 is opened, the catalyst from the cooling zone, which has a higher density than the catalyst in the regeneration zone, flows from behind the partition and over the baffle into the regeneration zone. Hot catalyst then flows over the top of the partition into the cooling zone. The circulation continues as long as valve 42 is open to remove the desired amount of heat from the regeneration zone. FIG. 2 is a cross-sectional view through section I-I' of the apparatus with the same numbered items having the same meaning. Suitable operating conditions for the heat removal method of the present invention are summarized in Table I.

TABLE I

| Conditions | Broad Range | Specific Example |
|---|---|---|
| Density of bed in cooling zone of regenerator, lbs./cubic foot | 25-40 | 33 |
| Density of Bed in regenerator zone of regenerator, lbs./cubic foot | 15-25 | 17 |
| Regenerator temp., °F. | 1200-1400 | 1320 |

TABLE I-continued

| Conditions | Broad Range | Specific Example |
|---|---|---|
| Aeration steam rate to cooling zone, lbs./hr./sq./ft. | 30-100 | 50 |
| Regeneration gas rate to regeneration zone, lbs./hr./sq. ft. | 200-600 | 450 |
| Water inlet rate to tubular coil, lbs./hr. for typical 50-100 MBTU/hr. heat removal | | |
| Fluidizing gas to zone between baffle and partition, lbs./hr./sq. ft. | 100-200 | 150 |

What is claimed is:

1. In a regenerator having an inner wall adapted to contain a bed of fluidized catalyst which comprises catalyst inlet means, catalyst outlet means, gas inlet means, gas outlet means, catalyst support means, a tubular cooling coil adapted to contain $H_2O$, the improvement which comprises: a first zone formed by a partition disposed in said regenerator substantially parallel to a section of the inner wall of the regenerator and at a spaced distance (a) above said catalyst support means, and (b) from said inner regenerator wall, said tubular coil being vertically disposed in the space between said partition and the inner wall of said regenerator, a baffle connected to said catalyst support means and projecting vertically upwardly, said baffle being at a spaced distance from said partition, said catalyst support means being imperforated from below said baffle to under said first zone formed by said partition and said inner wall of said regenerator wherein said coil is vertically disposed, and said catalyst support means having orifices below a second zone formed by said baffle and said inner wall of the regenerator on a side of said baffle opposite said first zone, means for introducing a first fluidizing gas into said first zone, means for introducing a second fluidizing gas into the space between said baffle and said partition, and control means disposed in said means for introducing said second fluidizing gas between said baffle and said partition to control the introduction of said fluidizing gas into said space in said regenerator.

2. The regenerator of claim 1 wherein said catalyst support means is a horizontal plate having a diameter ranging from about 15 to about 55 feet and wherein said partition is spaced from about 9 to about 18 inches above said horizontal plate.

3. The regenerator of claim 2 wherein said baffle has a height sufficient to overlap said partition by about 2 feet and wherein the horizontal distance between said baffle and said partition is between about 6 inches and 12 inches.

* * * * *